Oct. 20, 1953 A. E. FRANDI 2,656,221
VEHICLE WHEEL
Filed June 1, 1950
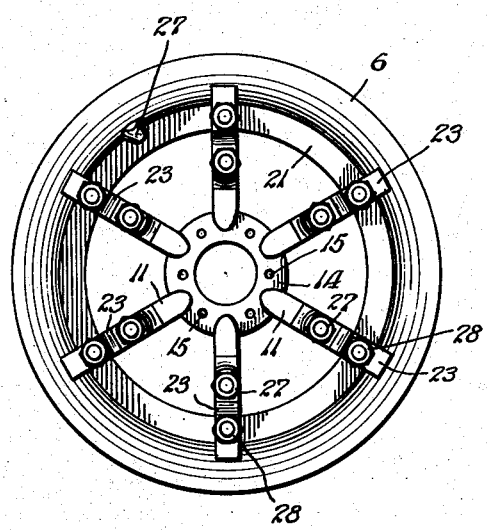
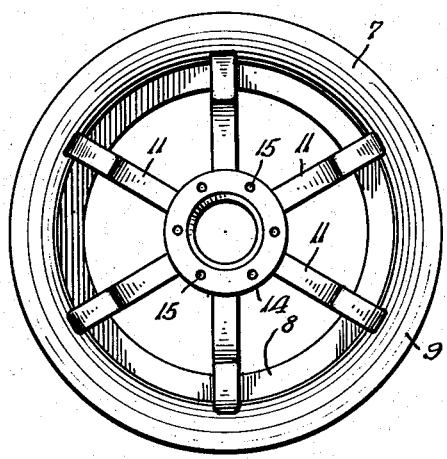
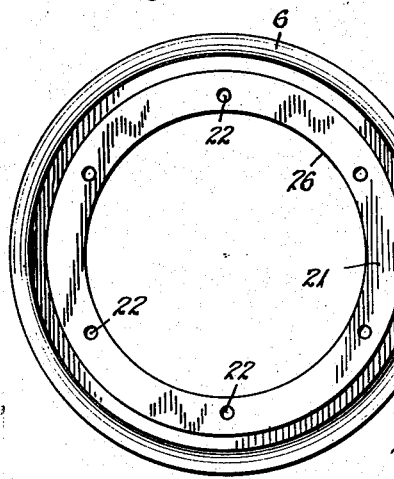
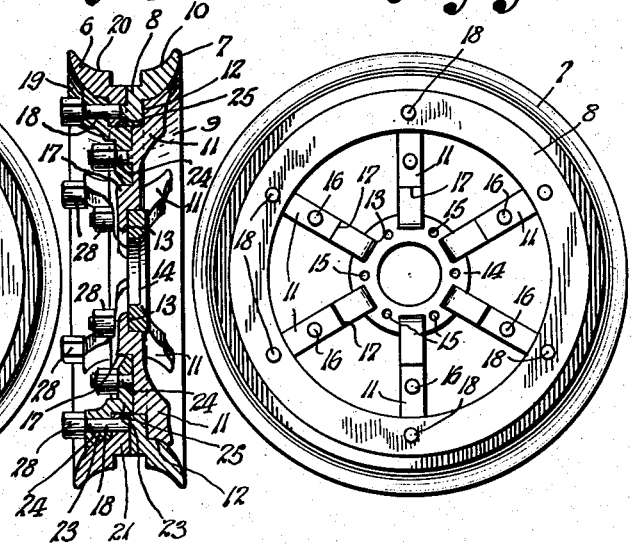
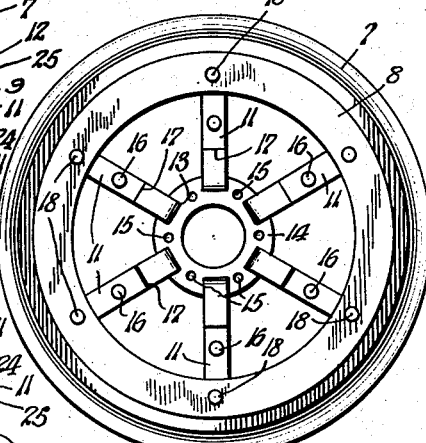
INVENTOR.
Antonio E. Frandi
BY
Eugene E. Stevens
ATTORNEY.

Patented Oct. 20, 1953

2,656,221

UNITED STATES PATENT OFFICE 2,656,221

VEHICLE WHEEL

Antonio E. Frandi, Mexico City, Mexico

Application June 1, 1950, Serial No. 165,429

5 Claims. (Cl. 301—12)

This invention relates to vehicle wheels of a type which are suitable for automobiles, airplanes and other vehicles which use inflated tires which must from time to time be removed from the wheel as when the tires are worn out or become punctured.

The primary object of the invention is to provide such a wheel made from metal, the same being constructed of two half sections, whereby the same can be readily separated for quick mounting and demounting of an inflated tire which is mounted on the rim portions of the wheel.

A further object of the invention is a two-piece wheel having inwardly radiating spokes which are welded to one section of the wheel at their outer ends and having their inner ends welded to a hub portion by which the wheel is attached to an axle. The spokes are each provided with a threaded stud as is likewise the inner rim portion of the wheel half.

A still further object provides one wheel section with a plurality of spaced holes for receiving the wheel rim studs when the wheel is assembled. A plurality of individual lugs having stud receiving openings therein fit the studs and when nuts are applied to the studs the lugs engage the wheel sections to lock the same together.

The invention is illustrated in the accompanying drawings, in which—

Fig. 1 is a front side elevational view showing the outer side of the assembled wheel;

Fig. 2 is a rear side elevational view showing the inner side of the assembled wheel;

Fig. 3 is a vertical sectional view with the studs and nuts shown in solid lines;

Fig. 4 is a side elevation of the inner side of the outer half of the wheel; and Fig. 5 is a side elevation looking at the inner side of the inner half of the wheel.

Referring specifically to the drawings, in which like numerals are used to designate similar parts throughout the various views, the outer or front half of the wheel is shown at 6, while the inner or rear half of the wheel is shown at 7. The rear section 7 of the wheel is provided with an annular inner rim portion 8 which terminates in an outwardly flared part which on its inner surface forms a curved portion 10. The curved portion 10 is adapted to receive one side of the bead portion of a pneumatic tire casing (not shown). A plurality of spokes 11 are welded as at 12 to the rear face of the wheel section 7, the front ends of the respective spokes 11 being welded as at 13 to the axle-receiving ring 14 which may be attached to the usual hub of a vehicle as by hub bolts passing through the openings 15. The spokes 11 are each provided on their inner faces with a threaded stud 16, the spokes each being cut away to provide a shoulder 17. The inner rim 8 of the wheel section 7 is flat and is provided with six equally spaced threaded studs 18, which studs are in alignment with the respective studs 16 heretofore referred to.

The outer or face wheel section 6 is flared outwardly as at 19 and is formed on its upper side with a convex surface 20 adapted to receive the opposite tire bead portion of a pneumatic tire casing, the outer section terminating in a flat faced annular rim 21 which matches the annular rim 8 of the wheel section 7. The annular rim 21 is provided with a plurality of equally circumferentially spaced stud-receiving openings 22, which openings receive the threaded studs 18 when the two half sections are assembled with the flat annular rim portions together. A plurality of removable lugs 23, having aligned spaced stud-receiving openings 24, are adapted to be mounted upon the studs 18 and the face section of the wheel. Each of said lugs 23 is further provided with an inner shoulder 25 which is adapted to engage with the front face portion 26 of the rim 21, the front end of the lug 23 being squared off and engaging with the shoulder 17 of the related spoke 11. The front face wheel section 6 is provided with the usual angularly directed tire stem-receiving opening 27.

Thus, it will be seen that I have provided a novel wheel construction which is readily adapted to be used as an automobile wheel, an airplane wheel, or in any other capacity where it is desirable that a quickly and easily demountable pneumatic tire-carrying wheel is desired. The wheel is composed of two substantially alike half members which are vertically separated into front and rear sections, the rear section carrying a plurality of spokes 11 which are welded at their outer ends to the wheel flange and at their inner ends to a hub member 14 having openings 15 which receive the usual studs of the hubs of usual known construction. The hub 14 is further provided with a central opening through which an axle may extend. The rear or inner wheel section 7 is further provided with a plurality of studs 16 fixed to the spokes and a like number of studs 18 fixed to the flange 8.

In assembling the wheel, the partially deflated pneumatic tire (not shown) is mounted on the rim sections of the wheel, in which position the outer section 6 has been moved to substantially align with the rear section 7, the studs 18 passing through the openings 22. Thereafter, the lugs 23 are applied in position on the studs 16 and 18, after which the nuts 28 are threaded to the studs 16 and 18 to draw the two wheel sections into tight face to face engagement. The wheel with its tire is now ready to be mounted as by the hub 14 to the usual hub portion (not shown) of an automobile or the like.

In the event of a deflated tire, the wheel can be readily removed from the vehicle hub, and thereafter by simply removing the stud nuts 28 the wheel sections can be separated and the tire easily removed. After repair, the tire can just as easily be remounted on the wheel.

I have therefore provided a wheel which requires no special tools for removing the tire therefrom, the wheel sections being readily separated by the use of a wrench for removing the nuts 28.

It is not intended that the invention be limited to the exact construction shown, but is capable of modification within the scope of the following claims.

I claim:

1. A vehicle wheel for mounting a pneumatic tire, comprising front and rear half sections each provided with a tire bead receiving rim portion, a plurality of spokes fixed at their outer ends to the rear wheel section, a central wheel hub supported by the inner ends of said spokes, studs extending from the wheel spokes and from the rear wheel rim portion, the studs of the rear wheel rim portion extending through openings in the rim portion of the front wheel section, a plurality of lugs engaging the front wheel section and the spokes and having openings receiving the studs, and lug nuts engaging the studs to draw the wheel sections together.

2. A vehicle wheel comprising front and rear half sections, each section having a tire-receiving rim portion, a plurality of spokes fixed to the rear wheel section and supporting a hub at their inner ends, a plurality of studs extending from the rear wheel section, the front wheel section having openings receiving certain of the studs, and a plurality of lugs engaging the front wheel section and the spokes and receiving the studs, and nuts threadedly engaging the studs to draw the wheel sections together.

3. A vehicle wheel comprising front and rear separable sections, each section having a tire-receiving rim portion and an inwardly extending flat faced flange portion, a plurality of studs extending from the face of the flange of the rear wheel section, spokes fixed to the rear wheel section and supporting a central wheel hub, studs extending from the spokes and in alignment with the studs of the flange, said spokes being cut away on their under sides to form an abutment, the front wheel section having spaced stud-receiving openings through the faced flange portion thereof, a plurality of lugs having openings to receive the spoke and wheel studs, said lugs having an inner arcuate portion engaging the outer face of the front section rim and having a portion engaging the outer edge surface of the front section flange, the lug terminating at its inner end in a squared surface which engages the abutment on the under side of the spoke, and nuts engaging the studs to draw the wheel sections into tight engagement.

4. A vehicle wheel split on its vertical axis to form front and rear half sections, each section having a tire-receiving rim portion, a plurality of spokes fixed to the rear section and supporting a wheel hub, threaded studs extending from the rear section, the front wheel section having openings receiving the studs, and a plurality of lugs engaging the front wheel section and the spokes and having openings through which the studs extend and nuts engaging the threaded studs to draw the wheel sections together.

5. A vehicle wheel for mounting a pneumatic tire, comprising a first and a second circumferential half section, each provided with a matching tire bead-receiving rim portion, a plurality of spokes fixed at their outer ends to said first wheel section, a central wheel hub supported by the inner ends of said spokes, studs extending from the wheel spokes and from said first section rim portion, the rim portion studs extending through openings in the second wheel section rim portion, a plurality of lugs engaging said second wheel section and the spokes and having openings receiving said studs, and lug nuts engaging the studs to draw the wheel sections together.

ANTONIO E. FRANDI.

References Cited in the file of this patent

UNITED STATES PATENTS

| Number | Name | Date |
|---|---|---|
| 615,059 | Davidson | Nov. 29, 1898 |
| 1,271,222 | Raflovich | July 2, 1918 |
| 1,512,418 | Godfrey | Oct. 21, 1924 |
| 1,750,407 | Kopp | Mar. 11, 1930 |
| 1,790,421 | Holt | Jan. 27, 1931 |
| 2,236,054 | Di Curzio | Mar. 25, 1941 |